(12) United States Patent     (10) Patent No.:    US 12,560,943 B2

Li et al.            (45) Date of Patent:     Feb. 24, 2026

(54) ROUTE NETWORK PLANNING FOR DRONE LOGISTICS IN URBAN ENVIRONMENT

(71) Applicants: City University of Hong Kong, Hong Kong (HK); Hangzhou Antwork Network Technology Co., Ltd., Hangzhou (CN)

(72) Inventors: Lishuai Li, Hong Kong (HK); Fang He, Wuhan (CN); Lei Zhang, Hangzhou (CN); Xinyu He, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 520 days.

(21) Appl. No.: 17/468,628

(22) Filed: Sep. 7, 2021

(65) Prior Publication Data

US 2022/0075393 A1     Mar. 10, 2022

Related U.S. Application Data

(60) Provisional application No. 63/075,410, filed on Sep. 8, 2020.

(51) Int. Cl.
| | |
|---|---|
| *G05D 1/00* | (2024.01) |
| *B64U 10/13* | (2023.01) |
| *B64U 101/64* | (2023.01) |

(52) U.S. Cl.
CPC ............. *G05D 1/104* (2013.01); *B64U 10/13* (2023.01); *B64U 2101/64* (2023.01); *B64U 2201/102* (2023.01)

(58) Field of Classification Search
CPC ...... G05D 1/104; B64C 39/024; B64U 10/13; G01C 21/20; G01C 23/00; G08G 5/0013;
(Continued)

(56) References Cited

U.S. PATENT DOCUMENTS 9,573,684 B2    2/2017   Kimchi et al.
9,760,087 B2    9/2017   Hoareau et al.
(Continued)

FOREIGN PATENT DOCUMENTS

| CN | 105069595 A | 11/2015 | |
|---|---|---|---|
| CN | 107571995 A | 1/2018 | |
| WO | WO-2021046013 A1 * | 3/2021 | ........... G06Q 10/047 |

OTHER PUBLICATIONS

Sampling-based algorithms for optimal motion planning Sertac Karaman and Emilio Frazzoli The International Journal of Robotics Research 2011 30:7, 846-894 (Year: 2011).*
(Continued)

*Primary Examiner* — Anne Marie Antonucci
*Assistant Examiner* — Jodi Jones
(74) *Attorney, Agent, or Firm* — Idea Intellectual Limited; Sam T. Yip

(57) ABSTRACT

The UAV system has one or more UAVs and an operating device. The operating device is connected to the UAVs through wireless communication. The management method includes: generating a plurality of position cells; prioritizing a plurality of OD pairs and generates a delivery sequence; output one or more route information according to the position cells and the delivery sequence; and transmitting the route information to one or more UAV. Each of the position cells has a cell type and a cell cost.

16 Claims, 7 Drawing Sheets

1

(58) Field of Classification Search
CPC .... G08G 5/0034; G08G 5/006; G08G 5/0069;
G08G 5/045; G06Q 10/083
USPC .. 701/3, 14, 301, 533, 701, 4, 532, 408, 16,
701/300, 1, 467, 400, 410, 23, 409, 11,
701/411, 117, 15, 25, 428
See application file for complete search history.

(56) References Cited

U.S. PATENT DOCUMENTS

| | | | |
|---|---|---|---|
| 10,068,486 B1 | 9/2018 | Bar-Zeev et al. | |
| 2016/0275801 A1 | 9/2016 | Kopardekar | |
| 2018/0051991 A1* | 2/2018 | Hong ................. | G01C 21/3446 |
| 2019/0108472 A1 | 4/2019 | Sweeney et al. | |
| 2019/0113356 A1* | 4/2019 | Fowe .................. | G08G 1/0145 |
| 2020/0356115 A1* | 11/2020 | Kubie .................. | G08G 1/0129 |
| 2022/0351627 A1* | 11/2022 | Ali ....................... | G08G 5/0013 |

OTHER PUBLICATIONS

Scalable Low-Cost Unmanned-Aerial-Vehicle Traffic Network, Jan. 11, 2016, Journal of Air Transportation, American Institute of Aeronautics and Astronautics (Year: 2016).*

* cited by examiner

2A

2B

1

ROUTE NETWORK PLANNING FOR DRONE LOGISTICS IN URBAN ENVIRONMENT

COPYRIGHT NOTICE

FIELD OF THE INVENTION

The present invention generally relates to unmanned aerial vehicles (UAVs), or drones, the control and management systems and methods thereof. More specifically, the present invention relates to systems and methods for route planning and traffic control for UAVs.

BACKGROUND

An unmanned aerial vehicle (UAV), commonly known as a drone, is an aircraft without any human pilot, crew or passengers onboard. The flight of some UAVs may be conducted with various degrees of autonomy, such as auto-pilot assistance, up to fully autonomous aircraft that has no provision for human intervention. UAVs have developed quickly recent years and applied successfully in many industrial applications like access in hard-to-reach areas, safety inspections, traffic monitoring, etc. and more applications remain to be mined.

The use of UAVs in logistic is promising. Using drones in logistic has the advantages on resources in terms of flexibility and efficiency. Hence it is expected to play more important roles and accelerate the development of logistic companies. Large corporations like Amazon Inc., Deutsche Post AG, UPS Inc., DPDgroup, etc., are already using drones in delivering packages and making significant progress in other operations.

For instance, Amazon developed a delivery system, Prime Air, to deliver packages less than five pounds in 30 minutes or less using drones; DPDgroup gained authorization to operate a regular commercial UAV delivery service; and drones are being used in blood products transportation for medical services.

However, the current state of the art focuses on last mile delivery and few works are involved in penultimate delivery stage. The drones deliver parcels among stations which can be vertiports, which are places provided for vertical takeoff and landing of UAV, and the routes between the vertiports needed to be optimized.

Also, drone delivery among stations in urban environment is challenging, and safety is hardly guaranteed. The costs of drone operation, aerial photography, and short-range surveillance are still very high. Technical challenges, such as obstacles identifying and routes planning in tight spaces are difficult to overcome. Even with only 10 stations, the number of routes can be up to 45. There is an unmet need for an unmanned aerial system (UAS) for UAV traffic management (UTM), especially in urban environment settings.

SUMMARY OF THE INVENTION

The present invention is related to a UAS traffic routing network for a plurality of UAVs to travel or transport goods simultaneously in an urban environment setting. It is an objective of the present invention to provide a system and method for conducting and managing path planning for every route in such traffic routing network.

In accordance with various embodiments of the present invention, the UAV system provided comprises one or more UAVs and an operating device. The operating device is connected to the UAVs through wireless communication. In accordance with various embodiments of the present invention, the management method includes: generating a plurality of position cells; prioritizing a plurality of OD pairs and generates a delivery sequence; outputting one or more route information according to the position cells and the delivery sequence; and transmitting the route information to one or more UAV. A position cell is a logical unit of space defined by a geographical boundary. Each of the position cells has a cell type and a cell cost.

In one embodiment, the operating device generates the position cells, prioritizes the OD pairs, generates the delivery sequence, and transmits the route information to the UAVs.

In an embodiment of the present invention, each of the route information has a plurality of line segments, and each of the line segments fulfills:

$$\|x_1-x_2\|_2 > d_{sep}$$

where $$x_1 \in [x_{i_1,j_1,k_1}^m, x_{i_1,j_1,k_1}^{m+1}], x_2 \in [x_{i_2,j_2,k_2}^m, x_{i_2,j_2,k_2}^{m+1}], (i_1, j_1, k_1) \neq (i_2, j_2, k_2),$$

and $d_{sep}$ is the minimum length of the line segments, and $$[x_{i_1,j_1,k_1}^m, x_{i_1,j_1,k_1}^{m+1}]$$

is a line segment of a route from waypoint:

$$x_{i_1,j_1,k_1}^m$$

to waypoint $$x_{i_1,j_1,k_1}^{m+1}$$

and $$[x_{i_2,j_2,k_2}^m, x_{i_2,j_2,k_2}^{m+1}]$$

is a line segment of a route from waypoint $$x_{i_2,j_2,k_2}^m$$

to waypoint $$x_{i_2,j_2,k_2}^{m+1},$$

3 and $$x^m_{i_1,j_1,k_1} = \left( x^m_{i_1,j_1,k_1}, y^m_{i_1,j_1,k_1}, z^m_{i_1,j_1,k_1} \right) \in \mathbb{R}^3$$

is coordinates of the m th waypoint of the $k_1$ the route connecting airport $i_1$ and $j_1$, and $$x^m_{i_2,j_2,k_2} = \left( x^m_{i_2,j_2,k_2}, y^m_{i_2,j_2,k_2}, z^m_{i_2,j_2,k_2} \right) \in \mathbb{R}^3$$

is coordinates of the m th waypoint of the $k_2$ the route connecting airport $i_2$ and $j_2$.

In accordance with one embodiment of the present invention, the step of generating the position cells comprises: discretizing a workspace into the position cells; setting cell types of portion of the position cells that corresponded to no flying area as obstacle; setting cell type of another portion of the position cells that corresponded to safe flying area as first area; setting cell type of another portion of the position cells that corresponded to crowded area as second area; and setting cell type of another portion of the position cells that corresponded to emergency only area as emergency.

In an embodiment of the present invention, each of the position cells contains one or more attributes; in each of the position cells, the attributes may contain permitted information, and the permitted information indicates flyable layer, flyable height, or non-flyable area; the attributes may also contain space cost, and the space cost is corresponded to the safety of UAV flying in an area or the safety of people living in the area; every position cell has a unique identification.

In accordance with one embodiment of the present invention, every OD pair comprises an original location information and a destinated location information. The step of generating the delivery sequence comprises: sorting the OD pairs according to the original location information and destinated location information; every OD pair may comprise a priority information. The step of generating the delivery sequence comprises: sorting the OD pairs according to their priority information; every OD pair comprises a profit information, and the step of generating the delivery sequence comprises: sorting the OD pairs according to their profit information; every OD pair comprises a direct distance information, and the step of generating the delivery sequence comprises: sorting the OD pairs according to their direct distance information; if the OD pairs have similar information, the step of generating the delivery sequence comprises: randomly shuffle positions of the OD pairs in the delivery sequence.

In accordance with one embodiment of the present invention, each of the route information indicates some of the position cells that are connected to each other's and not indicated by another route information. Every route information has its own priority level, and a group of the position cells indicated by the route information having second highest priority level is located beside another group of the position cells indicated by the route information having the highest priority level. The step of outputting the route information comprises: updating the position cells with an environment data; and followed by inputting the position cells and one of the OD pairs to a Lazy Theta* algorithm. The step of outputting the route information includes: inputting the position cells and one of the OD pairs to a Lazy Theta* algorithm with a space cost, and the space cost is $p(s) = \lambda_v \text{numOfCellsToReserve}(s)$, and numOfCellsToReserve is the number of the position cells that need to be reserved by the route information, and $\lambda_v$ is a space occupation cost coefficient that indicate a proportion of space cost in total cost.

BRIEF DESCRIPTION OF THE DRAWINGS

Embodiments of the invention are described in more details hereinafter with reference to the drawings, in which.

DETAILED DESCRIPTION

In the following description, systems and methods for conducting and managing flight routes of UAVs and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the following description, the terms "drone" and "unmanned aerial vehicle (UAV)" may be used interchangeably, and both refer to an aircraft or flight-capable machine without any human pilot, crew or passengers onboard. The flight of such UAV may be conducted with various degrees of autonomy, such as autopilot assistance, up to fully autonomous UAV that has no provision for human intervention.

Figure 1:
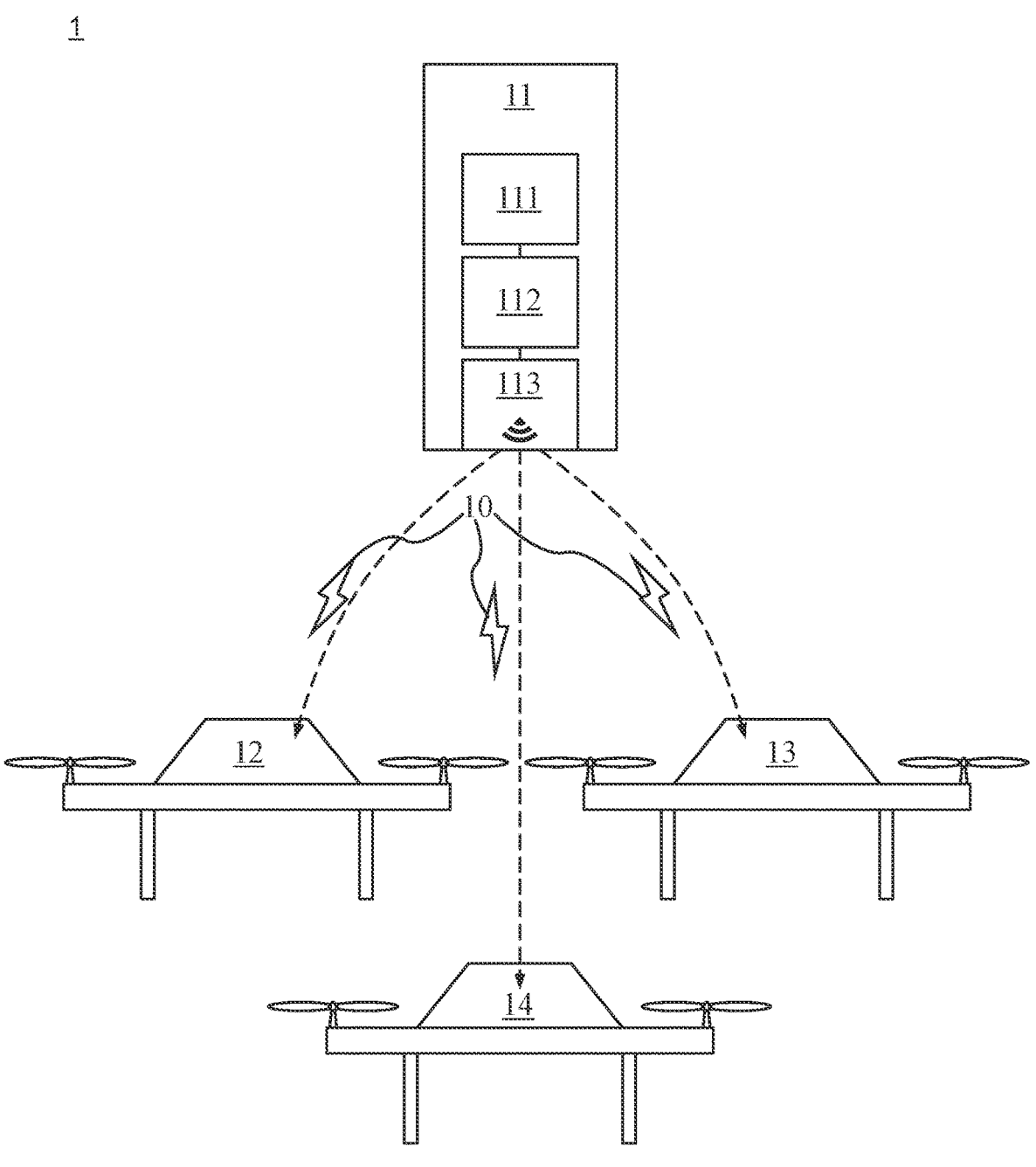
FIG. 1 depicts a schematic diagram of a UAV system in accordance with one embodiment of the present invention.

The present invention relates to managing a plurality of UAVs in urban high-density environment settings. FIG. 1 shows the schematic diagram of a UAV system 1 in accordance with various embodiments of the present invention. The UAV system 1 has an operating device 11, and UAVs 12, 13, and 14. The operating device 11 is connected to the UAVs through wireless communication 10.

For example, the operating device 11 can be a desktop, laptop, or server. The operating device 11 may have an input device 111, processor 112, and a wireless transferring module 113, and the processor 112 is electrically connected to the input device 111 and the wireless transferring module 113.

Figure 2:
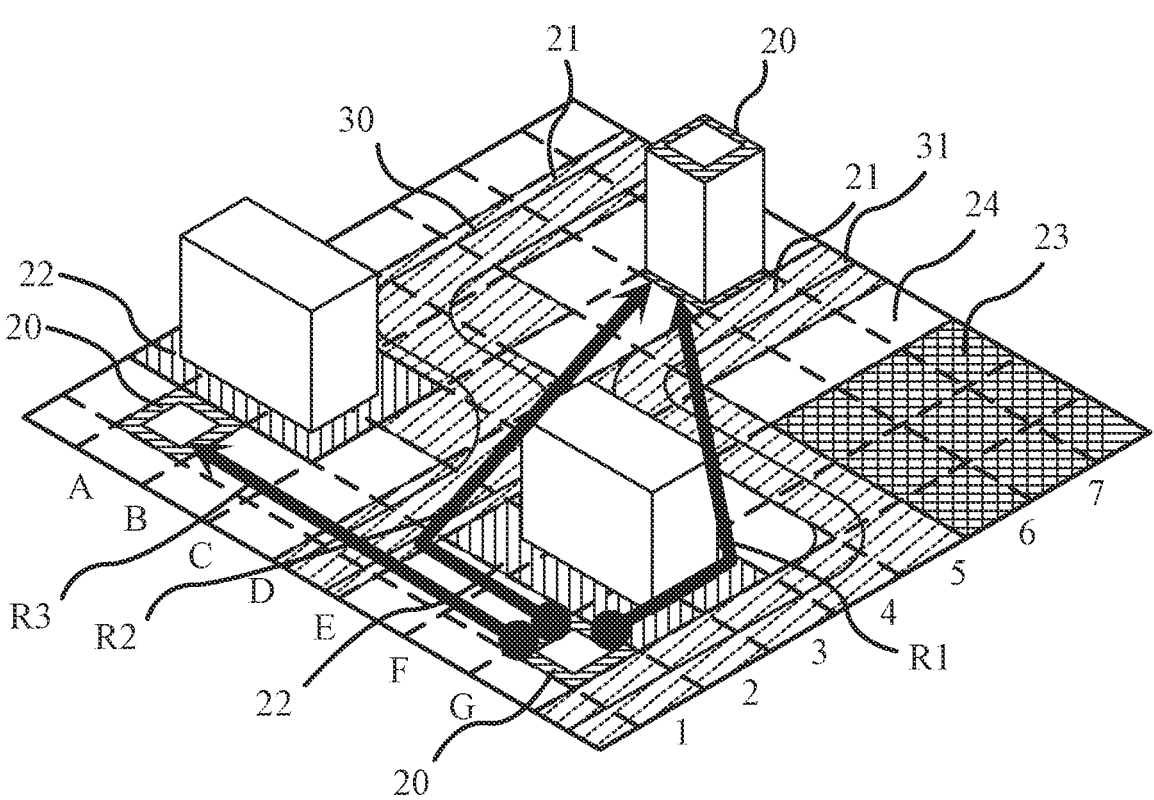
FIG. 2 depicts a schematic diagram of a workspace in accordance with one embodiment of the present invention.

FIG. 2 shows a workspace 2A in accordance with one embodiment of the present invention. In this embodiment, the managing method discretized the workspace 2A into multiple position cells A1~G7, and the position cells A1~G7 have been magnified. A position cell is a logical unit of space defined by a geographical boundary. Each of the position cells has a cell type and a cell cost. For example, position cell 20 has a cell type labeled as vertiport, and the cell cost is 0. Vertiport is the area where the drone may take off or land. Position cell 21 has a cell type labeled as first area, and the cell cost is 100. Position cell 22 has a cell type labeled as second area, and the cell cost is 300. Position cell 23 has a cell type labeled as obstacle, and the cell cost is N/A. Position cell 24 has a cell type labeled as third area, and the cell cost is 200.

In other words, the area having less obstacle and residents, such as river area 30 and road area 31 will have enough space for drones to fly without bothering residents, and, therefore; the of the position cells in the area is low. The cost for a delivery will be the sum of cell cost of all the position cell the route occupied. For example, in the embodiment, the delivery fee will be higher if the route R1 is passing through a residential area (i.e., position cells H2 and H3) having higher cell cost, and the delivery fee will be lower if the route R2 is passing through the free flying area (i.e., position cells E1, D3, and D4) having lower cell cost.

The management method in this embodiment received a plurality of OD pairs. For example, an OD pair indicates delivery from position cell H1 to position cell B1, and another OD pair indicates delivery from position cell H1 to position cell D6. Position cell D6 is a vertiport on the roof of a hospital, which will need urgent delivery, and position cell B1 is a vertiport for delivery daily supplies, which is less urgent than hospital. Therefore, the management method will generate a delivery sequence, and the OD pair including the position cell D7 should be arrange before the OD pair including the position cell B1.

To be specific, the operating device 11 arrange the OD pairs in the delivery sequence according to their original position cells or destinated position cells, and the OD pairs are prioritized, and the delivery sequence is generated.

The management method output one or more route information according to the position cells A1 to G7 and the delivery sequence. For example, one of the route information indicates the route R1, and the other route information indicates the route R2. And the route information indicating route R1 is transmitted to the drone 12 through wireless transferring module 113, while the route information indicating route R2 is transmitted to the drone 13. Therefore, the drone 12, and drone 13 may make delivery according to the route information. In other words, each of the route information indicates some of the position cells that are connected to each other's. In one embodiment, every position cell may be indicated by only one route information, and not indicated by another route information at the same time.

Since the route information is outputted according to the position cells and the delivery sequence, the UAV system will make the first delivery without considering whether the position cell is occupied by other delivery, and the second delivery will consider the rest of the position cell.

Figure 3:
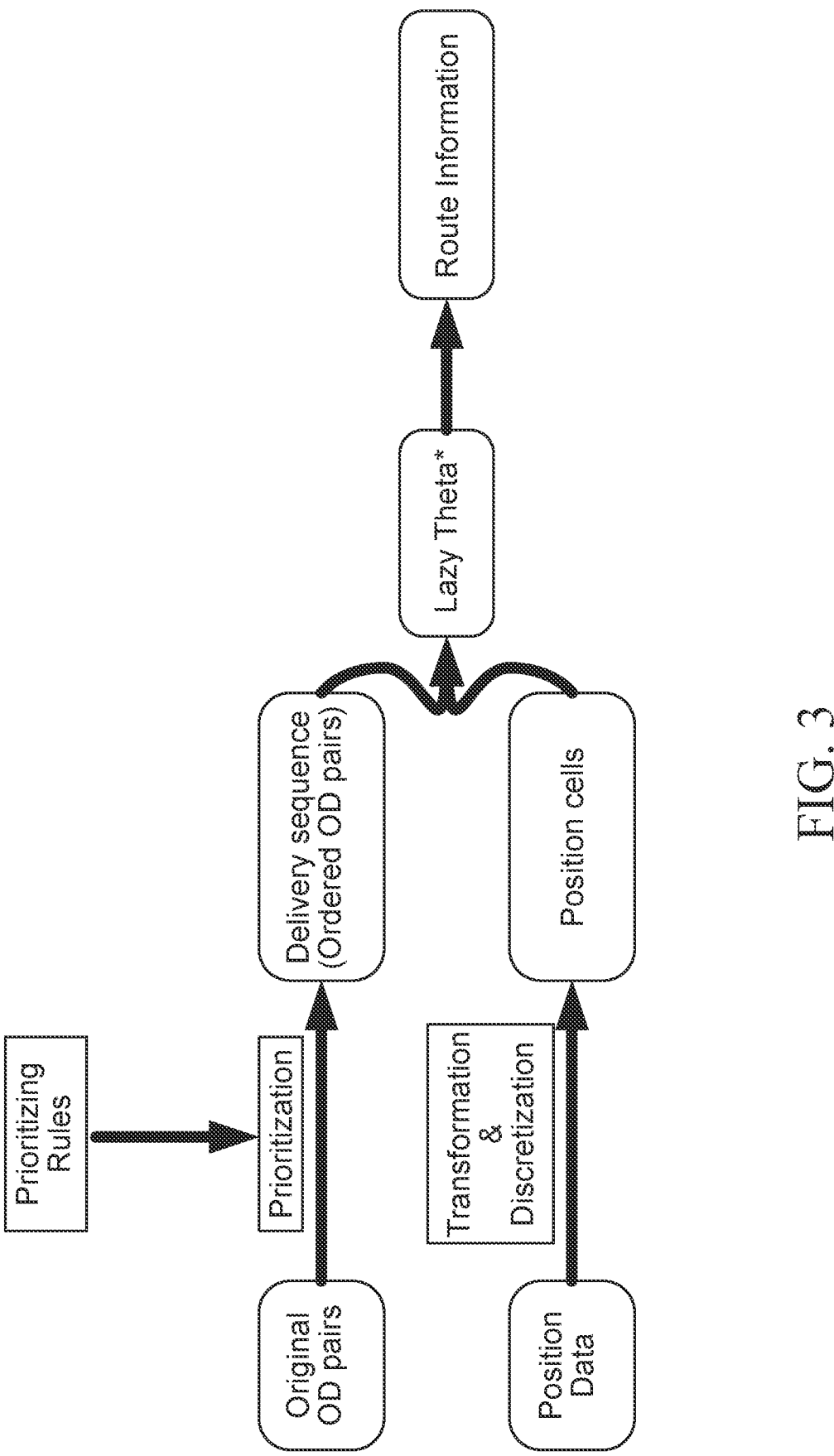
FIG. 3 depicts a work flow of UAV management method in accordance with one embodiment of the present invention.

The frame work of the present invention for route networking planning is shown in FIG. 3. While prioritizing the OD pairs, the management method may also use prioritizing rules including priority (i.e., urgent product or normal product) and profits (i.e., cell cost) to generate ordered OD pairs.

In this embodiment, the step of outputting the route information comprises: inputting the position cells and one of the OD pairs to a Lazy Theta* algorithm. Also, the management method regards previously planned position cells as obstacles, and the position cells occupied by the first route information is being treated as obstacles while planning the second route information. Therefore, we transform the first route information into an environment data. Before inputting the second OD pairs to the Lazy Theta* algorithm, the method updates the position cells with the environment data.

Furthermore, the step of outputting the route information comprises: input the position cells and one of the OD pairs to a Lazy Theta* algorithm with a space cost, and the space cost is $p(s)=\lambda_v \text{numOfCellsToReserve}(s)$, and numOfCellsToReserve is the number of the position cells that need to be reserved by the route information, and $\lambda_v$ is a space occupation cost coefficient that indicate a proportion of space cost in total cost.

In one embodiment, the Lazy theta* algorithm is shown as follows:

| Algorithm: Lazy Theta* with Space Cost |
|---|
| SetVertex (s) : |
|   |   if     NOT lineofsight (parent(s),s) then |
|   |   |     /* Path 1*/ |
|   |   |     parent(s) := $\text{argmin}_{s' \in \text{nghbr}_{vis}(s) \cap closed}$ |
|   |   |     (g(s') + d(s',s) + t(s',parent(s)) + c(s',parent(s)) + |
|   |   |     p(s',parent(s))); |
|   |   |     g(s) := $\min_{s' \in \text{nghbr}_{vis}(s) \cap closed}$ |
|   |   |     (g(s') + d(s',s) + t(s',parent(s)) + c(s',parent(s)) + |
|   |   |     p(s',parent(s))); |
|   |   end |
|   end |
| ComputeCost (s, s') : |
|   |     /* Path 2*/ |
|   |   if     g(parent(s)) + d(parent(s),s') + t(s',parent(s)) + |
|   |   c(s',parent(s)) + p(s',parent(s)) < g(s') then |
|   |   |     parent(s') := parent(s); |
|   |   |     g(s') := g(parent(s)) + d(parent(s),s') + |
|   |   |     t(s',parent(s)) + c(s',parent(s)) + p(s',parent(s)); |
|   |   end |
|   end |

The lineofsight (parent(s),s) indicates the parent(s) and point s as having a line of sight or not. The parent(s), which is used to extract the path after the search halts by following the parent pointers from $s_{goal}$ to $s_{start}$. The g value g(s) is the length of the shortest path from $s_{start}$ to s found so far. The d value d(s', s), The t value t(s', parent(s)), and the c value c (s', parent(s)) indicate normal operational cost items.

In this embodiment, a shape of every position cell A1 to G7 can be cubic. However, the present invention is not limited thereto. In various embodiments, a shape of every position cell may be polygonal prism, or cylinder.

Figure 4:
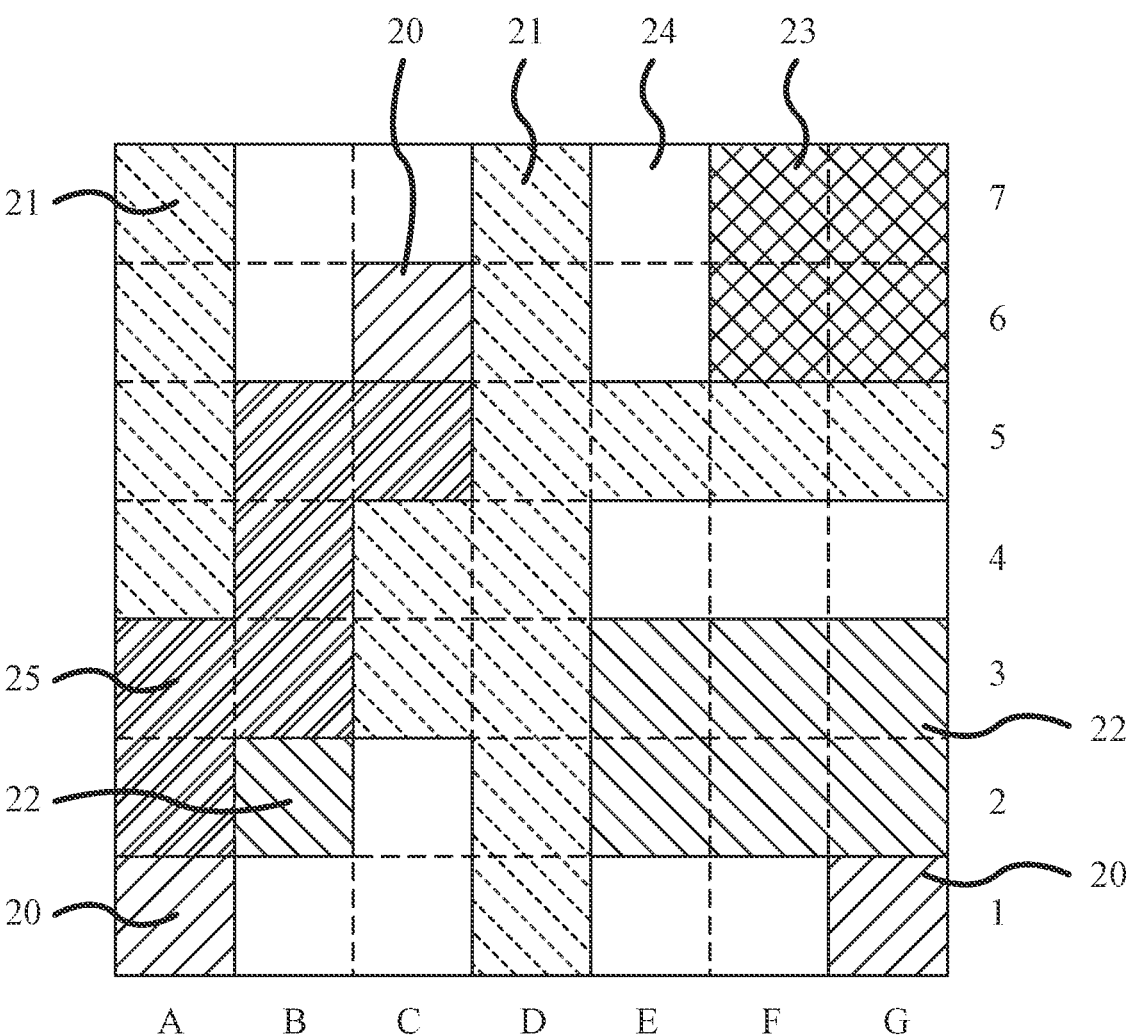
FIG. 4 depicts a top view of a work space in accordance with one embodiment of the present invention.

FIG. 4 shows a top view of another workspace 2B, and the rivers and building are omitted. As described above, the management method generates a plurality of position cells A1 to G7. Moreover, the step of generating the position cells A1 to G7 comprising: discretizing the workspace 2B into the position cells A1 to G7; setting cell types of portion of the position cells F6, F7, G6, and G7 that corresponded to no flying area as obstacle; setting cell type of another portion of the position cells A4, A5, A6, A7, C3, C4, D1, D2, D3, D4, D5, D6, D7, E5, F5, and G5 that corresponded to safe flying area as first area; setting cell type of another portion of the position cells B2, E2, E3, F2, F3, G2, and G3 that corresponded to crowded area as second area; and setting cell type of another portion of the position cells A2, A3, B3, B4, B5, and C5 that corresponded to emergency only area as "emergency".

In one embodiment, the position cells A2, A3, B3, B4, B5, and C5 will not be occupied by any route information in normal condition. The position cells A2, A3, B3, B4, B5, and C5 having the emergency cell type will only be planned for emergency. An emergency route information will indicate only the position cells A2, A3, B3, B4, B5, and C5 having the emergency cell type, and the route information indicated the shortest route. In other words, the position cells having the emergency cell type is on the shortest route between two vertiports, without considering it's a residential area or road or river.

However, the position cells A1 to G7 may include more information, and the position cells A1 to G7 can contains one or more attributes.

In one embodiment, the attributes of the position cells A1 to G7 may contain permitted information. The permitted information indicates flyable layer, flyable height, or non-flyable area.

For example, the position cells F6, F7, G6, and G7 may corresponded to airport or military bases that contain sensitive information. Therefore, the permitted information of the position cells F6, F7, G6, and G7 will be a non-flyable area.

For example, the position cell A1 is corresponded to vertiport. Therefore, the permitted information of the position cell A1 will be flyable layer: 0~120 m. The position cell E2 is corresponded to residential area. Therefore, the permitted information of the position cell E2 is the flyable height: 80 m.

In one embodiment, the attributes may contain space cost. The space cost is corresponded to the safety of UAV flying in the area or the safety of people living in the area.

For example, the position cells E2 may have higher space cost because people may be crowded in the corresponded area, which means it may not be safe enough to fly in the area. The position cell D2 may have lower space cost because the corresponded area is river, which means it's safe to fly in the area.

In this embodiment, the space cost may be similar to the cell cost. However, the present invention is not limited thereof. In one embodiment, there might be position cell with high cell cost and low space cost, or position cell with low cell cost and high space cost.

The position cells have different unique identification. For example, in the embodiment, position cells A1 to G7 use coordinate number as it's unique identification. However, the present invention is not limited thereto. The unique identification can in any form.

Every OD pair has an original location information and a destinated location information, and the step of generating the delivery sequence comprises: sorting the OD pairs according to the original location information and destinated location information. As described above, the delivery will be the first priority if the original location information or the destinated location information include hospital.

Moreover, in one embodiment, every OD pair may further include a priority information, and the step of generating the delivery sequence comprises: sorting the OD pairs according to their priority information.

For example, the priority information may be "Urgent", "High", "Normal", or "Low". Users can define the priority information with their requirement through the input device 111, and the delivery sequence may follow and fulfill the user's requirement.

In another embodiment, every OD pair may further include a profit information, and the step of generating the delivery sequence comprises: sorting the OD pairs according to their profit information.

The profit information may vary with the cargo. For example, delivery of jewelry may set the profit information as high, and delivery of daily supplies may set the profit information as low.

In yet another embodiment, every OD pair may further include a direct distance information, and the step of generating the delivery sequence comprises: sorting the OD pairs according to their direct distance information. All the components above have their actual meaning, e.g., priority information reflects urgency of the route indicated by the OD pair; profit information reflects the earning after building the route while the direct distance information reflects part of the cost of the route.

Figure 5:
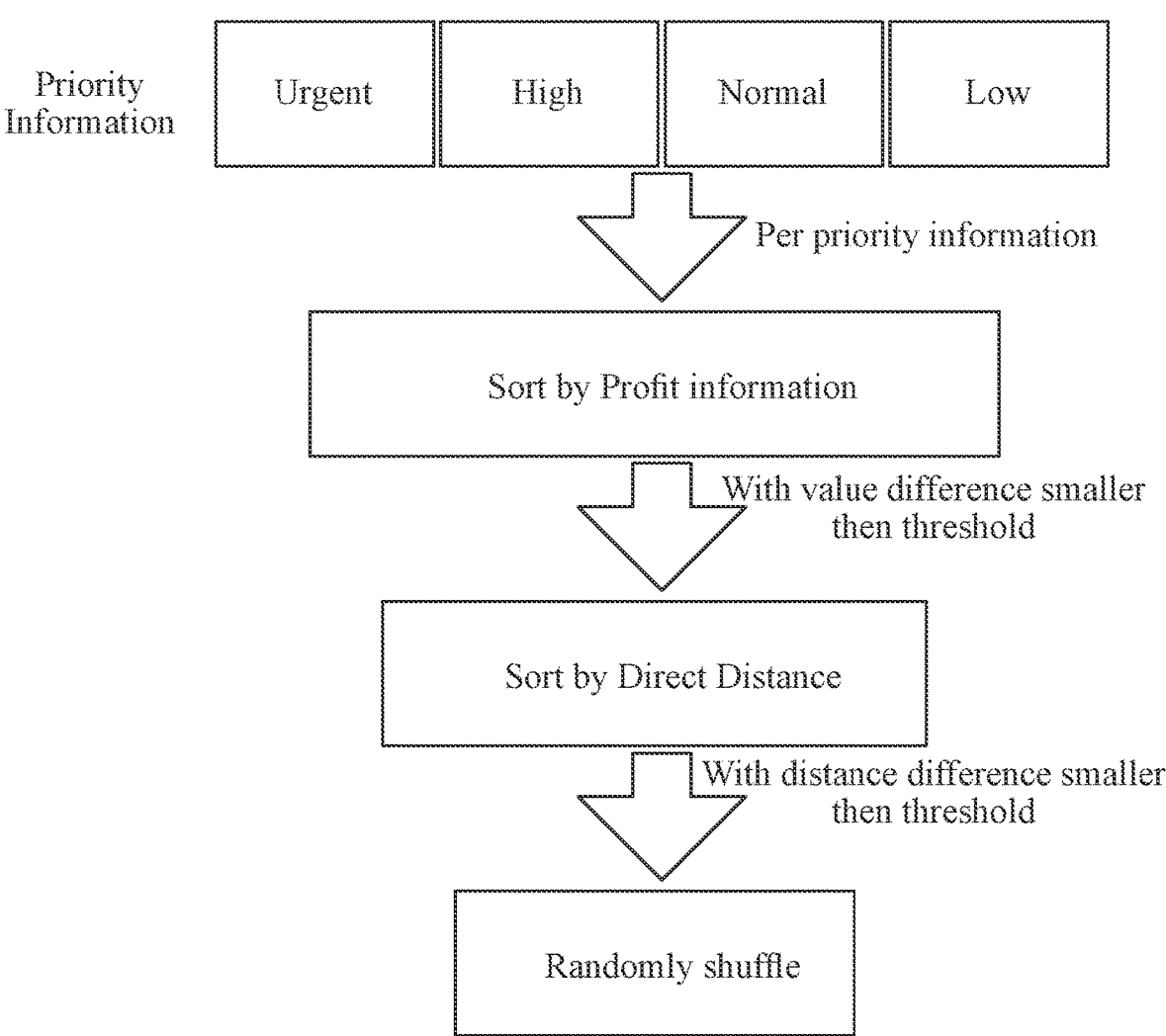
FIG. 5 illustrates a designing rule of sorting the OD pairs in accordance with one embodiment of the present invention.

In one embodiment, the designing rule to sort all the OD pairs is that shown in FIG. 5. In the same priority information, multiple OD pairs are sort by profit information. If the profit information is similar, and the difference therebetween is smaller than a threshold, the OD pairs is sorted by direct distance information.

When the OD pairs have similar information (i.e., the priority information, the profit information, and the direct distance information), the step of generating the delivery sequence comprises: randomly shuffle positions of the OD pairs in the delivery sequence.

With the priority information, the profit information, and the direct distance information, the OD pairs may be properly sorted in the delivery sequence.

Figure 6:
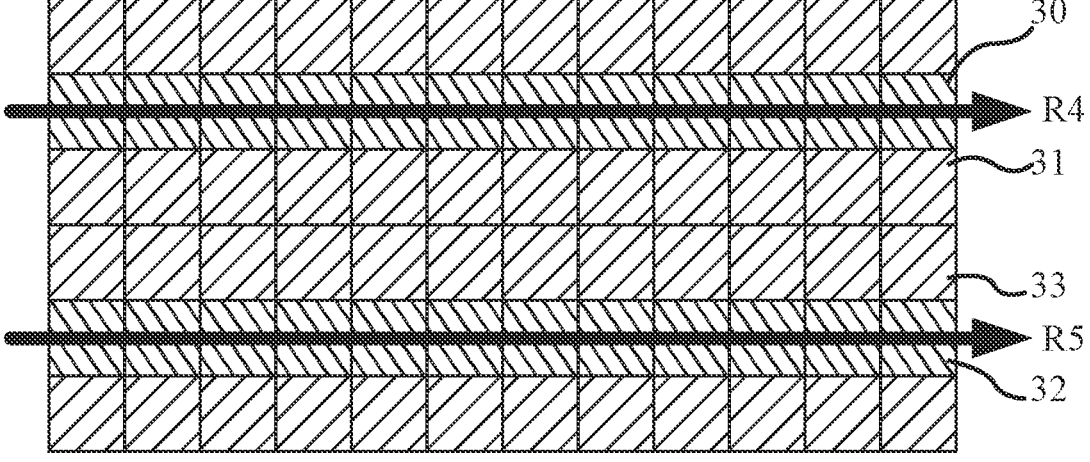
FIGS. 6 and 7 the depict schematic diagrams of routes in accordance with one embodiment of the present invention.
Figure 7:
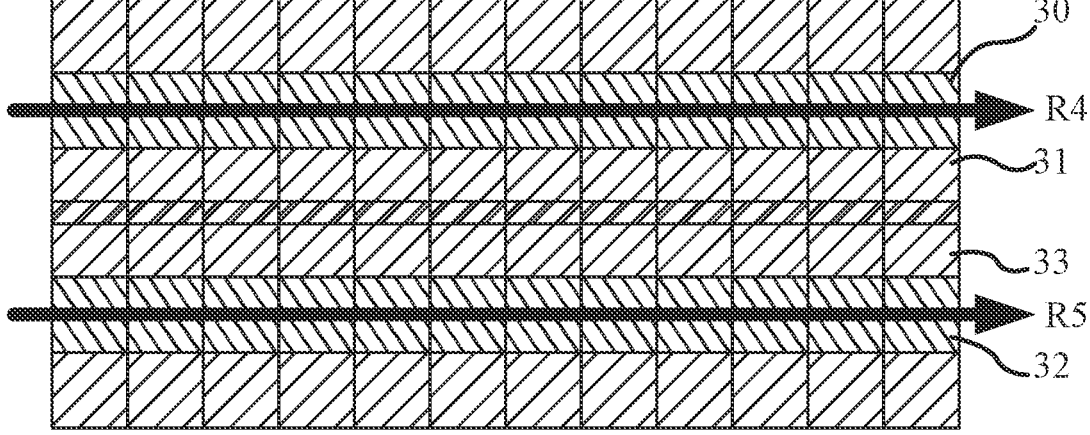

In one embodiment, the management method defines the space occupied by one route as the space around the rout and the route itself. Larger occupied space leads to higher space cost for more space resource. A plurality of occupied position cells are shown in FIG. 6. The position cells 30 are occupied by the route R4 itself, and the position cells 31 are the protection zone of the route R4. The position cells 32 are occupied by the route R5 itself, and the position cells 33 are the protection zone of the route R5.

In this embodiment, the position cells 31 and the position cells 33 are adjoined. To be specific, every route information has its own priority level, and a group of the position cells 32, 33 indicated by the route information having second highest priority level is located beside another group of the position cells 30, 31 indicated by the route information having the highest priority level.

Also, the route R5 treat the protection zone of the route R4 as obstacle while planning, and the safety of these two deliveries are enhanced by higher space cost.

In one embodiment, the position cells 31 and the position cells 33 may overlap, and the space cost is reduced with the safety of these two deliveries.

In one embodiment, each of the route information has a plurality of line segments, and each of the line segments fulfills: $\|x_1-x_2\|_2 > d_{sep}$. The $$x_1 \in [x_{i_1,j_1,k_1}^m, x_{i_1,j_1,k_1}^{m+1}], x_2 \in [x_{i_2,j_2,k_2}^m, x_{i_2,j_2,k_2}^{m+1}], (i_1, j_1, k_1) \neq (i_2, j_2, k_2),$$

and $d_{sep}$ is the minimum length of the line segments, and $$[x_{i_1,j_1,k_1}^m, x_{i_1,j_1,k_1}^{m+1}]$$

is a line segment of a route from waypoint $$x_{i_1,j_1,k_1}^m$$

to waypoint $$x_{i_1,j_1,k_1}^{m+1},$$

and $$\left[x_{i_2,j_2,k_2}^{m}, x_{i_2,j_2,k_2}^{m+1}\right]$$

is a line segment of a route from waypoint $$x_{i_2,j_2,k_2}^{m}$$

to waypoint $$x_{i_2,j_2,k_2}^{m+1},$$

and $$x_{i_1,j_1,k_1}^{m} = \left(x_{i_1,j_1,k_1}^{m}, y_{i_1,j_1,k_1}^{m}, z_{i_1,j_1,k_1}^{m}\right) \in \mathbb{R}^3$$

is coordinates of the m the waypoint of the $k_1$ the route connecting airport $i_1$ and $j_1$, and $$x_{i_2,j_2,k_2}^{m} = \left(x_{i_2,j_2,k_2}^{m}, y_{i_2,j_2,k_2}^{m}, z_{i_2,j_2,k_2}^{m}\right) \in \mathbb{R}^3$$

is coordinates of the m th waypoint of the $k_2$ the route connecting airport $i_2$ and $j_2$. For example, the $d_{sep}$ is within a range from 0.1 m to 100 m.

In another embodiment, new information of the position cells may be easily extended as an extra cell attribute in the future. Also, geofence can be easily presented because the graph search method can only search in these position cells. Furthermore, changes in environment can be adapted conveniently by transforming cell attributes.

After airports for UAVs are built in urban areas by institutions, companies can decide which airport pairs to transport goods according to order demands and determine pairs' importance and expected profits with market survey, then they can use the information to generate route network and applying for corresponding spaces from civil aviation administration to build routes among these airports. After that, companies can use the route network system to:

(1) transport goods with UAVs from origin airport to destination airport and not only one UAV can be in the route, a certain number of UAVs can be in the routes simultaneously only if they satisfy the safe distance; and (2) monitor the position of UAVs in the route network to check the delivery progress.

All or portions of the embodiments disclosed herein may be implemented using one or more of specially configured computing devices, computer processors, or electronic circuitries including but not limited to graphics processing units (GPUs), application specific integrated circuits (ASICs), field programmable gate arrays (FPGAs), and other programmable logic devices configured or programmed according to the teachings of the present disclosure. Computer instructions or codes running in the computing devices, computer processors, or programmable logic devices can readily be prepared by practitioners skilled in the software or electronic art based on the teachings of the present disclosure. The aforesaid one or more computing devices may include one or more of server computers, personal computers, laptop computers, mobile computing devices such as smartphones and tablet computers.

The electronic embodiments include computer-readable storage media having the computer instructions or codes stored therein, which can be used to configure or program the computing devices, computer processors, or electronic circuitries to perform any of the processes of the present invention; and to store data generated by any of the processes of the present invention. The computer-readable storage media include, but are not limited to, floppy disks, optical discs, Blu-ray Disc, DVD, CD-ROMs, magneto-optical disks, solid-state discs, ROMs, RAMs, SRAMs, DRAMs, flash memory devices, electrically programmable read-only memories (EPROMs), electrically erasable programmable read-only memories (EEPROMs), or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

Moreover, in interpreting the invention, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An operating device for unmanned aerial vehicle (UAV) route planning and management for a plurality of UAVs, the operating device comprising a processor and a wireless transferring module, the operating device is configured to:

connect, through the wireless transferring module, to a plurality of UAVs for data communication;

generate, by the processor, a plurality of position cells, wherein each of the position cells is a logical unit of space defined by a geographical boundary, and each of the position cells has a cell type and a cell cost;

prioritize, by the processor, a plurality of origin-destination (OD) pairs, and generate, by the processor, a delivery sequence;

generate, by the processor, a plurality of route information according to the position cells and the delivery sequence, each of the plurality of the route information being assigned to a corresponding UAV of the plurality of UAVs; and transmit, through the wireless transferring module, the route information to the respective UAVs for controlling their autonomous flight navigation according to the route information;

wherein each of the route information indicates a plurality of position cells that are connected to each other, and the corresponding UAV of the plurality of UAVs navigates through airspace corresponding to the position cells indicated by the route information;

wherein each of the route information further indicates one or more position cells that are not indicated by another one of the route information, using a first indication;

wherein one or more position cells that are indicated by a second indication provided from a previous route information are treated as obstacles for which the corresponding UAV of the plurality of UAVs shall not navigate through airspace corresponding to position cells that are treated as obstacles, and wherein the first indication and the second indication are established prior to the route information being transmitted to the corresponding UAV of the plurality of UAVs; and wherein the processor is further configured to generate a route network comprising the plurality of route information and integrating the previous route information assigned to other UAVs, and wherein the route network is established prior to transmitting the route information to the plurality of UAVs.

2. The operating device of claim 1, wherein each of the route information has a plurality of line segments, and each of the line segments fulfills:

$$\|x_1 - x_2\|_2 > d_{sep}$$

where $x_1 \in [x_{i_1 j_1 k_1}{}^m, x_{i_1 j_1 k_1}{}^{m+1}]$, $x_2 \in [x_{i_2 j_2 k_2}{}^m, x_{i_2 j_2 k_2}{}^{m+1}]$, $(i_1, j_1, k_1) \neq (i_2, j_2, k_2)$, and $d_{sep}$ is the minimum length of the line segments, and $[x_{i_1 j_1 k_1}, x_{i_1 j_1 k_1}{}^{m+1}]$ is a line segment of a route from waypoint $x_{i_1 j_1 k_1}{}^m$ to waypoint $x_{i_1 j_1 k_1}{}^{m+1}$, and $[x_{i_2 j_2 k_2}{}^m, x_{i_2 j_2 k_2}{}^{m+1}]$ is a line segment of a route from waypoint $x_{i_2 j_2 k_2}{}^m$ to waypoint $x_{i_2 j_2 k_2}{}^{m+1}$, and $x_{i_1 j_1 k_1}{}^m = (x_{i_1 j_1 k_1}{}^m, y_{i_1 j_1 k_1}{}^m, z_{i_1 j_1 k_1}{}^m) \in \mathbb{R}^3$ is coordinates of the m th waypoint of the $k_1$ the route connecting airport $i_1$ and $j_1$, and $x_{i_2 j_2 k_2}{}^m = (x_{i_2 j_2 k_2}{}^m, y_{i_2 j_2 k_2}{}^m, z_{i_2 j_2 k_2}{}^m) \in \mathbb{R}^3$ is coordinates of the m th waypoint of the $k_2$ the route connecting airport $i_2$ and $j_2$.

3. The operating device of claim 1, wherein the generation of the position cells by the processor comprising:

discretizing a workspace into the position cells;

setting cell types of portion of the position cells that corresponded to no flying area as obstacle;

setting cell type of another portion of the position cells that corresponded to safe flying area as first area;

setting cell type of another portion of the position cells that corresponded to crowded area as second area; and setting cell type of another portion of the position cells that corresponded to emergency only area as emergency.

4. The operating device of claim 1, wherein each of the position cells contains one or more attributes.

5. The operating device of claim 4, wherein in each of the position cells, the attributes may contain permitted information, and the permitted information indicates flyable layer, flyable height, or non-flyable area.

6. The operating device of claim 4, wherein in each of the position cells, the attributes may contain space cost, and the space cost is corresponded to the safety of UAV flying in an area or the safety of people living in the area.

7. The operating device of claim 1, every position cell has a unique identification.

8. The operating device of claim 1, wherein every OD pair comprises an original location information and a destinated location information, and the step of generating the delivery sequence comprises:

sorting the OD pairs according to the original location information and destinated location information.

9. The operating device of claim 1, wherein every OD pair comprises a priority information, and the generation of the delivery sequence by the processor comprises:

sorting the OD pairs according to their priority information.

10. The operating device of claim 1, wherein every OD pair comprises a profit information, and the generation of the delivery sequence by the processor comprises:

sorting the OD pairs according to their profit information.

11. The operating device of claim 1, wherein every OD pair comprises a direct distance information, and the generation of the delivery sequence by the processor comprises:

sorting the OD pairs according to their direct distance information.

12. The operating device of claim 1, wherein the OD pairs have similar information, and the generation of the delivery sequence by the processor comprises:

randomly shuffle positions of the OD pairs in the delivery sequence.

13. The operating device of claim 1, wherein every route information has its own priority level, and a group of the position cells indicated by the route information having second highest priority level is located beside another group of the position cells indicated by the route information having the highest priority level.

14. The operating device of claim 1, wherein the generation of the route information by the processor comprises:

inputting the position cells and one of the OD pairs to a Lazy Theta* algorithm; and computing Lazy Theta* algorithm with a space cost, and the space cost is $p(s) = \lambda_v \text{numOfCellsToReserve}(s)$, and numOfCellsToReserve is the number of the position cells that need to be reserved by the route information, and $\lambda_v$ is a space occupation cost coefficient that indicate a proportion of space cost in total cost.

15. The operating device of claim 14, wherein before the step of inputting the position cells comprises:

updating the position cells with an environment data.

16. A system for managing multiple UAVs, comprising:

a plurality of UAVs; and an operating device, wherein the operating device is connected to the UAVs through wireless communication;

wherein the operating device is configured to:

generate a plurality of position cells, each of the position cells is a logical unit of space defined by a geographical boundary, and each of the position cells has a cell type and a cell cost;

prioritize a plurality of OD pairs and generate a delivery sequence;

generate a plurality of route information according to the position cells and the delivery sequence, each of the plurality of the route information being assigned to a corresponding UAV of the plurality of UAVs;

transmit the route information to the respective UAVs for controlling their autonomous flight navigations according to the route information; and wherein each of the route information indicate a plurality of position cells that are connected to each other, and the UAVs navigate through airspace corresponding to the position cells indicated by the route information;

wherein each of the route information further indicates one or more position cells that are not indicated by another one of the route information, using a first indication;

wherein one or more position cells that are indicated by a second indication provided from a previous route information are treated as obstacles for which the UAVs shall not navigate through airspace corresponding to position cells that are treated as obstacles, and wherein the first indication and the second indication are established prior to the route information being transmitted to a corresponding UAV of the plurality of UAVs; and wherein the processor is further configured to generate a route network comprising the plurality of route information and integrating the previous route information assigned to other UAVs, and wherein the route network is established prior to transmitting the route information to the plurality of UAVs.

\* \* \* \* \*